United States Patent
Hsu et al.

(10) Patent No.: US 7,695,663 B2
(45) Date of Patent: Apr. 13, 2010

(54) METHOD OF MAKING HERMETIC SEALS FOR HERMETIC TERMINAL ASSEMBLIES

(75) Inventors: John S. Hsu, Oak Ridge, TN (US); Laura D. Marlino, Oak Ridge, TN (US); Curtis W. Ayers, Kingston, TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 1183 days.

(21) Appl. No.: 10/837,767

(22) Filed: May 3, 2004

(65) Prior Publication Data

US 2004/0232592 A1 Nov. 25, 2004

Related U.S. Application Data

(60) Provisional application No. 60/472,545, filed on May 22, 2003, provisional application No. 60/472,543, filed on May 22, 2003.

(51) Int. Cl.
 *B29C 45/14* (2006.01)
(52) U.S. Cl. .................. 264/259; 264/69; 264/101; 264/261; 264/272.11; 264/272.13; 264/272.14; 264/272.15; 264/553; 156/73.6; 156/285; 156/307.7; 156/312
(58) Field of Classification Search ................. None
See application file for complete search history.

(56) References Cited

U.S. PATENT DOCUMENTS

| | | | | |
|---|---|---|---|---|
| 2,910,959 A | * | 11/1959 | Drom et al. | 118/50 |
| 2,949,641 A | * | 8/1960 | Quackenbush | 264/277 |
| 3,507,004 A | * | 4/1970 | Taleff | 264/102 |
| 3,564,709 A | * | 2/1971 | Hickton | 29/883 |
| 3,825,639 A | * | 7/1974 | Bulin | 264/72 |
| 3,829,263 A | * | 8/1974 | Yao et al. | 425/145 |
| 4,580,003 A | | 4/1986 | Bowsky et al. | |
| 4,584,433 A | | 4/1986 | Bowsky et al. | |
| 5,176,541 A | * | 1/1993 | Mori | 439/736 |
| 5,185,388 A | * | 2/1993 | Murata et al. | 523/466 |
| 5,471,015 A | | 11/1995 | Paterek et al. | |
| 5,617,297 A | * | 4/1997 | Lo et al. | 361/737 |
| 5,657,811 A | * | 8/1997 | Cook | 164/97 |
| 6,509,525 B2 | | 1/2003 | Honkomp et al. | |

* cited by examiner

*Primary Examiner*—Jeffrey Wollschlager
(74) *Attorney, Agent, or Firm*—Novak Druce + Quigg LLP; Gregory A. Nelson; Gregory M. Lefkowitz

(57) ABSTRACT

This invention teaches methods of making a hermetic terminal assembly comprising the steps of: inserting temporary stops, shims and jigs on the bottom face of a terminal assembly thereby blocking assembly core open passageways; mounting the terminal assembly inside a vacuum chamber using a temporary assembly perimeter seal and flange or threaded assembly interfaces; mixing a seal admixture and hardener in a mixer conveyor to form a polymer seal material; conveying the polymer seal material into a polymer reservoir; feeding the polymer seal material from the reservoir through a polymer outlet valve and at least one polymer outlet tube into the terminal assembly core thereby filling interstitial spaces in the core adjacent to service conduits, temporary stop, and the terminal assembly casing; drying the polymer seal material at room temperature thereby hermetically sealing the core of the terminal assembly; removing the terminal assembly from the vacuum chamber, and; removing the temporary stops, shims.

18 Claims, 9 Drawing Sheets

METHOD OF MAKING HERMETIC SEALS FOR HERMETIC TERMINAL ASSEMBLIES

CROSS REFERENCE TO RELATED APPLICATIONS

This application claims the benefit of U.S. Provisional Application 60/472,545, filed May 22, 2003 and Provisional Application 60/472,543, filed May 22, 2003, both herein incorporated by reference in their entirety. This application is also related to U.S. application Ser. No. 10/716,060, filed Nov. 18, 2003 and U.S. patent application Ser. No. 10/837,993, filed the same day as this application, entitled "Hermetic Terminal Assembly for Hermetic Inverters/Converters", both herein incorporated by reference in their entirety.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention relates to methods for making seal materials in hermetic terminal assemblies and more particularly to vacuum pressure casting of the seal material which produces a more durable hermetic terminal assembly for hermetic inverters/converters using refrigerant for cooling.

DESCRIPTION OF THE BACKGROUND ART

The reliability of the methods of making hermetically sealed terminal assemblies used in compressors is well recognized. Terminal assemblies made by the Vitrus Company, Amphenol, and Ceramaseal are typical examples of compressor assemblies made with standard methods. Examples of compressor assemblies are also disclosed in U.S. Pat. No. 4,584,433, issued to B. Bowsky, et al. on Apr. 22, 1986; U.S. Pat. No. 5,471,015, issued to F. Dieter Paterek, et al. On Nov. 28, 1995. These two aforementioned patents were further concerned with conductive pin fusing and with pin design, respectively. U.S. Pat. No. 4,580,003, issued to B. Bowsky et al. on Apr. 1, 1986 teaches an aperture with flattened neck portion. U.S. Pat. No. 4,584,333, issued to B. Bowsky et. al. on Apr. 22, 1986, teaches the relative coefficients of expansion and softening point temperatures in U.S. Pat. No. 5,471,015, issued to F. D. Paterek et. al. on Nov. 28, 1995. U.S. Pat. No. 6,509,525 issued to Honkomp et al. on Jan. 21, 2003 further teaches an arc-resistant assembly.

The electrical current level and differential pressure experienced by compressor terminal assemblies is generally less than hermetic refrigerant container terminal assemblies that contain power electronic inverter/converter components. Hermetic terminal assemblies for inverters/converters require the longitudinal and radial coefficients of thermal expansions of the conductors to be compatible with those of the seal material (glass, ceramic, polymer, or other equivalent material). Furthermore, the chosen seal material between the terminal assembly and the material of the hermetic container must be compatible. Methods for making terminal assemblies used for the hermetic inverters/converters are distinct from the available hermetic terminal/connector assembly methods because:

(1) The electrical rating of the hermetic inverter/converter is generally much higher than that of a hermetic compressor. A 50 kW motor requires an inverter/converter that roughly corresponds to 1150-amp 3-phase line current for a 42-volt DC-link, and to 120-amp line current for a 400-volt DC-link.

(2) The DC-link bus, signal leads, and refrigerant tubing are extra items that differ from the AC electric power of a compressor. The DC-link-current magnitudes are also high. They are roughly 1400 amp and 150 amp, respectively, for the above two cases.

(3) The DC-link requires a low inductance circuit.

(4) There are minimums of six gate signal inputs that require low interference and short connections.

(5) Other additional diagnostic signals may also need to be included.

SUMMARY OF THE INVENTION

Power electronic dies in inverters/converters, such as those of the IGBT or MOSFET, have little thermal capacity and a critical junction temperature and can be located in high pressure regions of hermetic containers. The electrolytic capacitors in the same inverter/converter have better thermal capacity but should not be mounted in high pressure regions of hermetic containers to prevent contamination from sipping into the gap material between the positive and negative foils. Electrical and mechanical services for these power electronic devices placed inside hermetic containers require specialized seal materials and methods for making the terminal assemblies at the service conduit penetrations.

The polymer seal material can be hardened either at room temperature or at a higher baking temperature depending on the admixture of the polymer seal material. The baking step provides additional handling time before the polymer seal material sets. This invention teaches both hardening methods.

FIGS. 1a and 1b show embodiments for a method of vacuum pressure casting seal material used in hermetic terminal assemblies. FIG. 2 shows a hermetic container, using the terminal assembly, which can be made of steel or other magnetic or non-magnetic materials as long as these materials meet the pressure and sealing requirements. There are two zones inside the hermetic container; one is the liquid refrigerant zone and the other is the vapor refrigerant zone. The liquid refrigerant zone is good for cooling the power electronic dies and any other critical components. The vapor refrigerant zone is good for cooling the less critical components having relatively higher thermal capacities. The zone outside the hermetic container is cooled but without a high pressure. It has an ambient pressure. This zone can be used to cool the components such as the electrolytic capacitors. A thermally isolated housing is separating this zone from the ambient. The hermetic container and the thermally isolated housing with metal mesh (or foil) can be used for EMI shielding. A need exists for a method of making the hermetic terminal assemblies that provide electrical and mechanical services to the inverter/converter.

The hermetic terminal assembly method in this invention provides for routing AC power terminals, DC-link bus, signal leads, refrigerant tubing, and any additional wires for simplifying the manufacturing process and reducing the cost.

FIG. 3 shows an alternate embodiment of the hermetic inverter/converter with the terminal assembly housing electrical connections only. The liquid refrigerant supply tube comes from the top of the hermetic container, and mates to a distributor built into the terminal assembly, fitting in as the terminal assembly is inserted.

This invention teaches methods of making a hermetic terminal assembly comprising the steps of: inserting temporary stops, shims and jigs on the bottom face of a terminal assembly thereby blocking assembly core open passageways; mounting the terminal assembly inside a vacuum chamber using a temporary assembly perimeter seal and flange or threaded assembly interfaces; mixing a seal admixture and hardener in a mixer conveyor to form a polymer seal material; conveying the polymer seal material into a polymer reservoir; feeding the polymer seal material from the reservoir through a polymer outlet valve and at least one polymer outlet tube into the terminal assembly core thereby filling interstitial spaces in the core adjacent to service conduits, temporary stop, and the terminal assembly casing; drying the polymer seal material at room temperature thereby hermetically sealing the core of the terminal assembly; removing the terminal assembly from the vacuum chamber, and; removing the temporary stops, shims and jigs.

DETAILED DESCRIPTION OF THE PREFERRED EMBODIMENTS

Figure 1A:
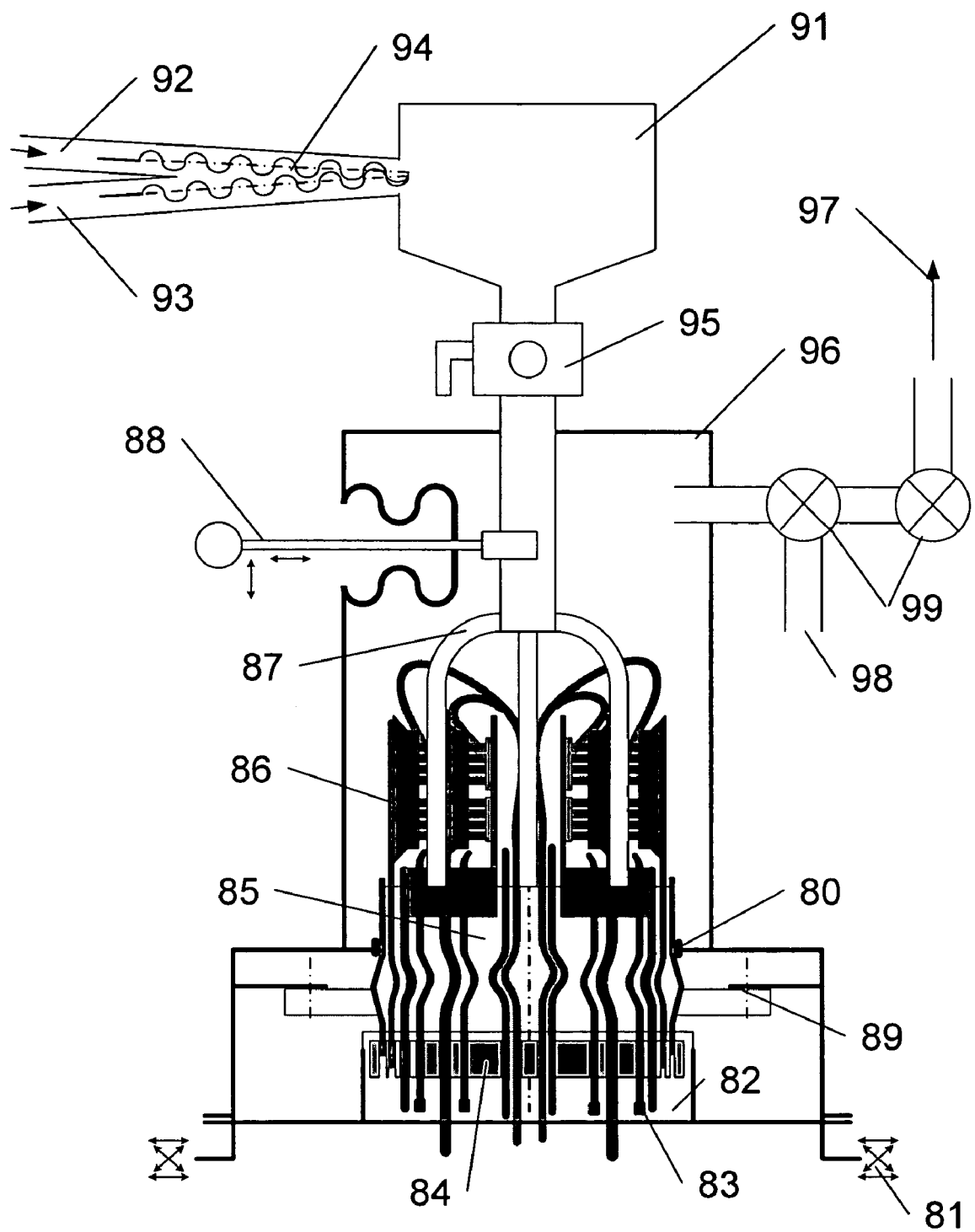
FIG. 1a shows a preferred embodiment for a method of vacuum pressure casting seal material used in hermetic terminal assemblies wherein the polymer seal material is dryed at room temperature.

FIG. 1a shows an embodiment for a method of vacuum pressure casting seal material used in hermetic terminal assemblies wherein the polymer seal material is cured at room temperature. The pressure inside the vacuum chamber 96 is controlled by two control valves 99 to achieve either atmospheric or higher pressure 98 or vacuum 97. The bottom face of the terminal assembly 86 uses a temporary stop 82 of wax or an equivalent substance, such as gypsum or silicon rubber that can be removed after the polymer seal material is cured, to contain the polymer seal material 85 during manufacturing. Shims or jigs 84 are used to maintain alignment of the service conduits during manufacturing. If the terminal assembly 86 contains refrigerant tubes, the lower ends of the tubes are stopped with temporary plugs 83 or other equivalent means. The vacuum chamber 96 is placed over the terminal assembly 86 with O-ring type temporary assembly perimeter seal 80 plus flange or threaded interfaces 89 to produce a vacuum seal between the terminal assembly 86 and the vacuum chamber 96. The seal admixture 93 comprising a mixture of at least one polymer and at least one material selected from the group consisting of graphite fibers, ceramic powder, glass powder, and glass fibers is then mixed with the hardener 92 before being delivered to the polymer reservoir 91 through a mixer conveyor 94. To prevent premature hardening, the seal admixture 93 is mixed with the hardener 92 immediately before feeding. A polymer outlet valve 95 that leads to the inside of the vacuum chamber 96 controls the flow of the polymer. Multiple polymer outlet tubes 87 can be used as an option. The setup can be mounted on a shaker 81 to produce vibration during casting. An optional control arm 88 that moves the polymer outlet tube can be incorporated to the vacuum chamber 96 for controlling the polymer distribution. The polymer tubing 87 and polymer outlet valve 95 can be disposable for easy cleaning. After the seal material 85 is placed in the terminal assembly 86, the polymer outlet valve 95 is closed. Subsequently, the control valves 99 can alternate the pressure in the vacuum chamber 96 from vacuum 97 to pressure 98 for exerting settling forces on the seal material 85 thereby eliminating voids in the seal material 85 caused by, for example, vacuum or air pockets. After the seal material 85 is hardened, the temporary stop 82 and the shims or jigs 84 are removed.

Figure 1B:
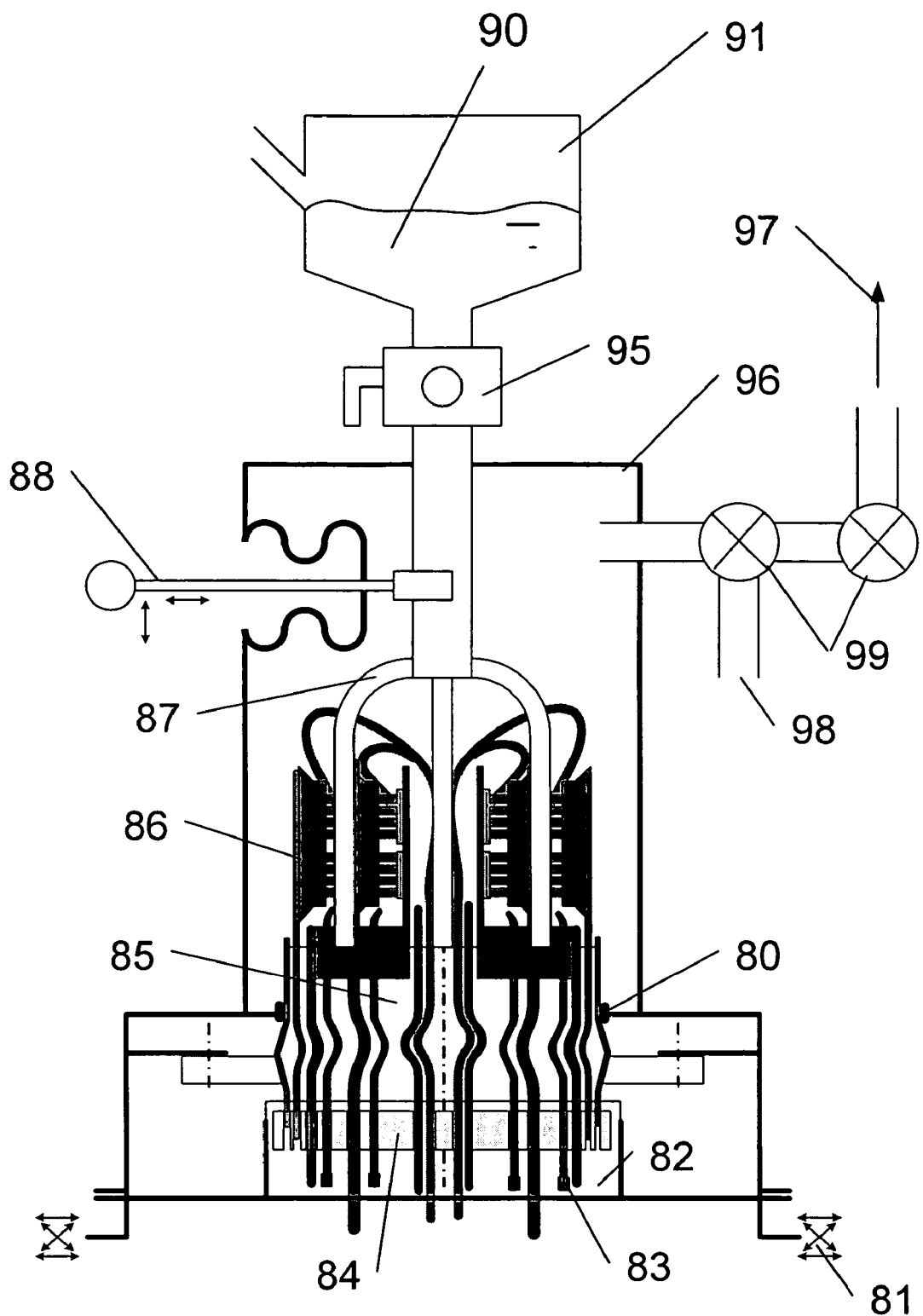
FIG. 1b shows another embodiment for a method of vacuum pressure casting seal material used in hermetic terminal assemblies wherein the polymer seal material is cured at higher than room temperature.

FIG. 1b shows an embodiment for a method of vacuum pressure casting seal material of a higher-than-room temperature cured polymer mix used in hermetic terminal assemblies. The pressure inside the vacuum chamber 96 is controlled by two control valves 99 to achieve either a pressure (atmospheric or higher) 98 or vacuum 97. The bottom face of the terminal assembly 86 uses a temporary stop 82 of gypsum or an equivalent substance that can withstand the baking temperature and be taken away after the polymer is cured to contain the polymer seal material 85 during manufacturing. Shims or jigs 84 are used to maintain alignment of the service conduits during manufacturing. If the terminal assembly 86 contains refrigerant tubes, the lower ends of the tubes are stopped with temporary plugs 83 or other equivalent means. The vacuum chamber 96 is placed over the terminal assembly 86 with O-ring type temporary assembly perimeter seal 80 plus flange or threaded interfaces 89 to produce a vacuum seal between the terminal assembly 86 and the vacuum chamber 96. The seal admixture comprising at least one polymer and at least one thermal expansion controlling material selected from the group consisting of glass powder, ceramic powder, glass fibers, and graphite fibers, is mixed with a higher-temperature hardener to form a seal premixture 90 before being delivered to the polymer reservoir 91. A polymer outlet valve 95 leading to the inside of the vacuum chamber 96 controls the flow of the premixture 90. Multiple polymer outlet tubes 87 can be used as an option. The setup can be mounted on an optional shaker 81 to produce vibration during casting. An optional control arm 88 that moves the polymer outlet tube can be incorporated into the vacuum chamber 96 for controlling the polymer distribution. The polymer tubing 87 and polymer outlet valve 95 can be reused because, without going through a baking process, the polymer in the tubing 87 and polymer outlet valve 95 is not hardened. After the seal premixture 90 is placed in the terminal, the polymer outlet valve 98 is closed. Subsequently, the control valves 99 can alternate the pressure in the vacuum chamber 96 from vacuum 97 to pressure 98 for exerting settling forces on the seal material 85 thereby eliminating voids in the seal material 85 caused by, for example, vacuum or air pockets. The terminal 86 is then placed in an oven (not shown) for curing the seal material 85.

After being properly baked thereby hardening the seal material 85, the temporary stop 82 and the shims or jigs 84 are removed.

Figure 2:
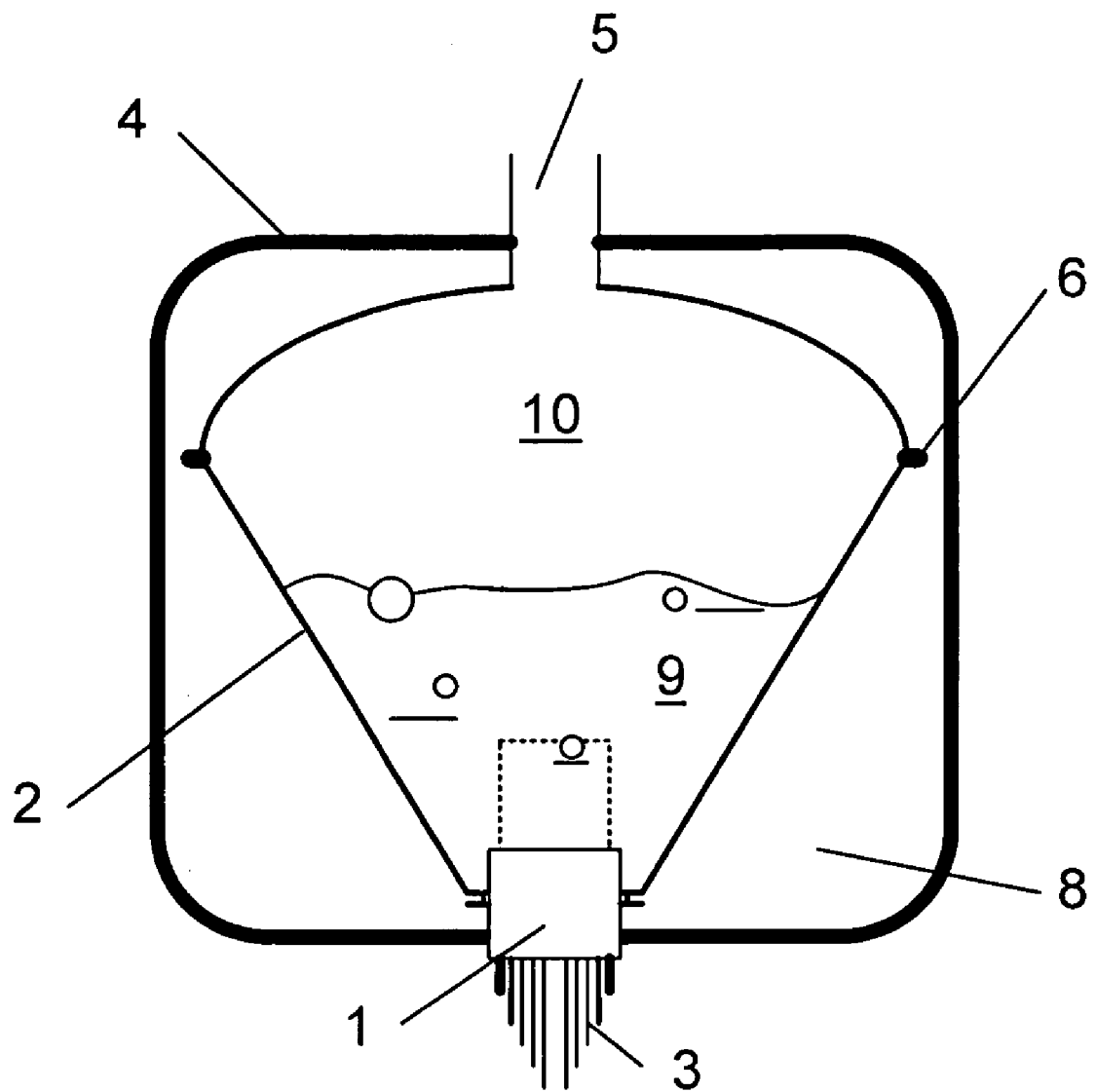
FIG. 2 shows an example of a hermetic inverter/converter with terminal assembly of electrical connections and tubing.

FIG. 2 shows a preferred arrangement of the hermetically sealed terminal assembly 1, manufactured using vacuum pressure casting of this invention, mounted in a multi-zone hermetic inverter/converter cooling chamber 40. The hermetic container 2 can be made of steel, magnetic material, non-magnetic material, metal, and non-metal pressure vessel materials that meet the pressure, temperature and sealing requirements of the refrigerant and the EMI shielding requirements of the electronic components. A joint seam 6 is integral with the walls of the hermetic container 2. The hermetic container 2 has a sealed terminal assembly 1 having service conduits 3 selected from the group consisting of AC phase conductors, DC link conductors, gate signal leads, diagnostic signal wires, and refrigerant tubing. The hermetic container 2 also has at least one vapor refrigerant outlet 5. There are two zones inside the hermetic container 2; one is the liquid refrigerant zone 9 and the other is the vapor refrigerant zone 10. The liquid refrigerant zone 9 is suitable for cooling the power electronic dies and other critical components using direct liquid refrigerant contact cooling. The vapor refrigerant zone 10 is suitable for cooling the less critical, high thermal capacity components using direct vapor refrigerant contact cooling. The ambient cooling zone 8, outside the hermetic container 2, provides cooled ambient pressure conditions for cooling components such as the electrolytic capacitors at atmospheric pressure. A thermally isolated housing 4 isolates the ambient cooling zone 8 from the ambient and creates a cooled interstitial space between the refrigerant filled hermetic container 2 and the thermally isolated housing 4. The interstitial space is the ambient cooling zone 8 that is cooled by indirect heat transfer to the refrigerant through the refrigerant filled hermetic container 2. The hermetic container 2 and the thermally isolated housing 4 with metal mesh (or foil) can be used for EMI shielding.

Figure 3:
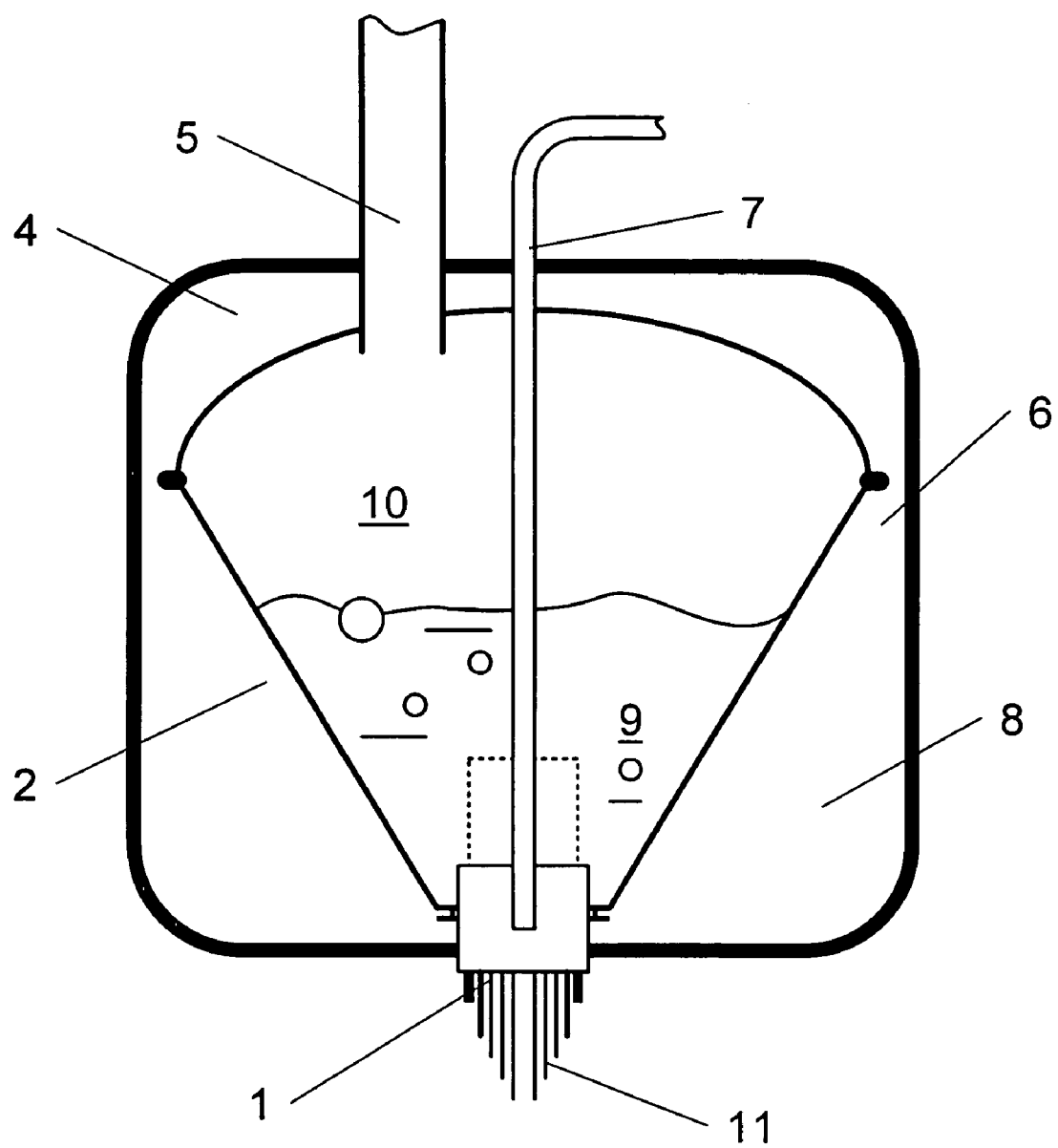
FIG. 3 shows an example of a hermetic inverter/converter with electrical only terminal assembly.

FIG. 3 shows another preferred arrangement of the hermetically sealed terminal assembly 1 with a liquid refrigerant supply tube 7 routed from the top of the hermetic container 2 and mating to a distributor (not shown) built into the terminal assembly 1. The terminal assembly 1 is mounted in a multi-zone hermetic inverter/converter cooling chamber 40. The hermetic container 2 can be made of steel, magnetic material, non-magnetic material, metal, and non-metal pressure vessel materials that meet the pressure, temperature and sealing requirements of the refrigerant and the EMI shielding requirements of the electronic components. A joint seam 6 is integral with the walls of the hermetic container 2. The sealed terminal assembly 1 has service conduits 11 selected from the group consisting of AC phase conductors, DC link conductors, gate signal leads, and diagnostic signal wires. The hermetic container 2 also has at least one vapor refrigerant outlet 5. There are two zones inside the hermetic container 2; one is the liquid refrigerant zone 9 and the other is the vapor refrigerant zone 10. The liquid refrigerant zone 9 is suitable for cooling the power electronic dies and other critical components using direct liquid refrigerant contact cooling. The vapor refrigerant zone 10 is suitable for cooling the less critical, high thermal capacity components using direct vapor refrigerant contact cooling. The ambient cooling zone 8, outside the hermetic container 2, provides cooled ambient pressure conditions for cooling components such as the electrolytic capacitors at atmospheric pressure. A thermally isolated housing 4 isolates the ambient cooling zone 8 from the ambient and creates a cooled interstitial space between the refrigerant filled hermetic container 2 and the thermally isolated housing 4. The interstitial space is the ambient cooling zone 8 that is cooled by indirect heat transfer to the refrigerant through the refrigerant filled hermetic container 2. The hermetic container 2 and the thermally isolated housing 4 with metal mesh (or foil) can be used for EMI shielding.

Figure 4:
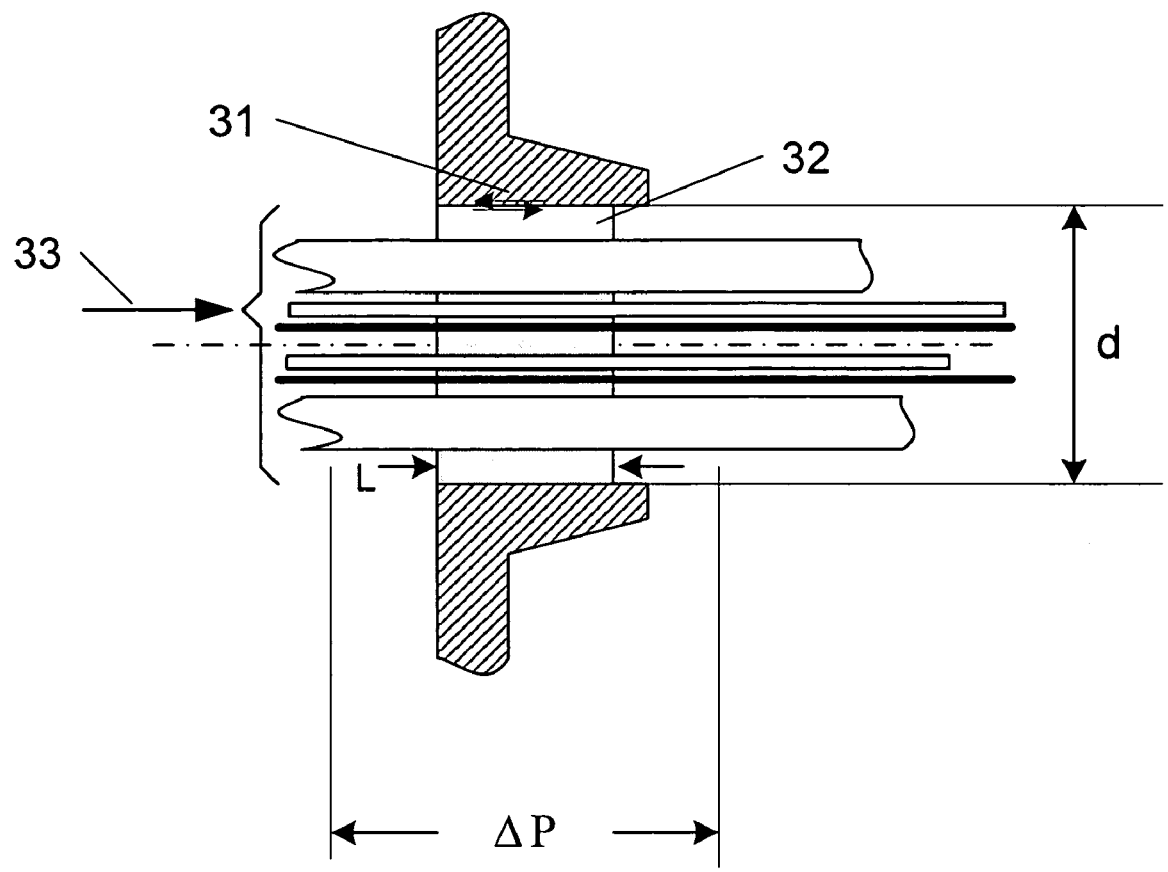
FIG. 4 shows the seal diameter, d, and shearing stress on seal material.

FIG. 4 shows the shear stress 31 imposed by force 33 on the seal material 32 of a sealed hermetic terminal with an outer diameter, d, with the seal material 32 adhering to the terminal casing inner wall. Under a given pressure difference, $\Delta P$, between the inside and the outside of the hermetic container, the force 33 pushing the seal material towards outside of the container is $$\frac{\pi \cdot d^2}{4} \Delta P.$$

This force is countered by the seal material 32 having an interfacing periphery area of $\pi \cdot d \cdot L$. The shearing stress 31 on the seal material 32 is the force divided by the peripheral area, which yields:

$$\text{Shearing stress} = \frac{\frac{\pi \cdot d^2}{4} \Delta P}{\pi \cdot d \cdot L} = \frac{d \cdot \Delta P}{4 \cdot L}$$

Under a given pressure difference $\Delta P$ and seal length L, the shearing stress of the seal material goes up in proportion to the seal diameter d. Therefore, for a relatively large seal diameter we can transfer part of the shearing stress 31 to a compression stress for the seal material 32 using service conduits with tapered shapes.

Figure 5A:
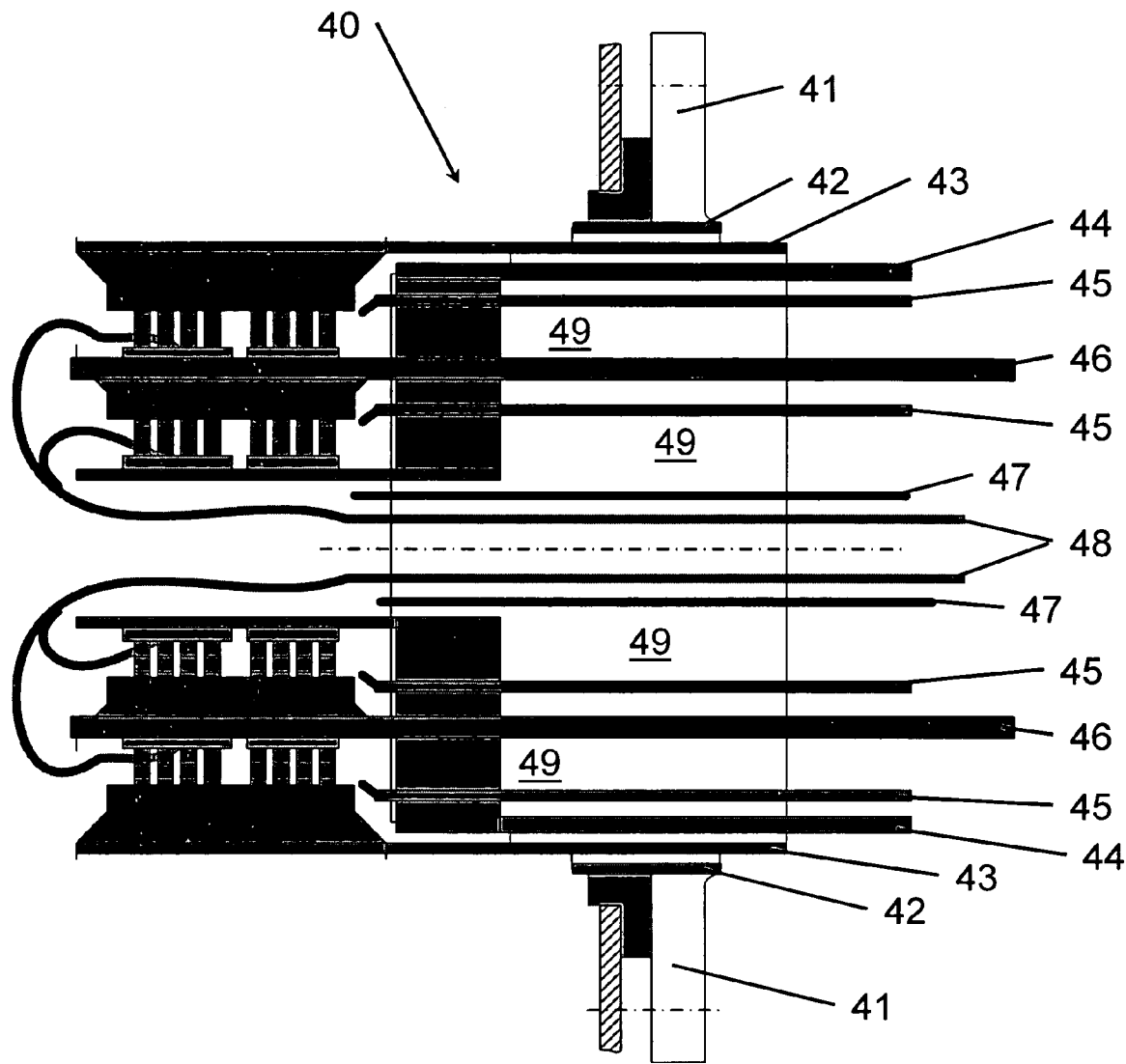
FIG. 5a is a side view of an embodiment of the hermetic terminal assembly.

FIG. 5*a* is a side view of an embodiment of the hermetic terminal assembly 40 mounted in a hermetic container 41. The terminal assembly casing 42 encompasses a collection of service conduits identified as; negative DC link conductor 43, positive DC link conductor 44, refrigerant tubing 45, AC phase conductor 46, diagnostic signal wires 47, gate signal leads 48, and seal material 49. FIG. 4*b* is a front view of the hermetic terminal assembly 40 showing the same components.

Figure 5B:
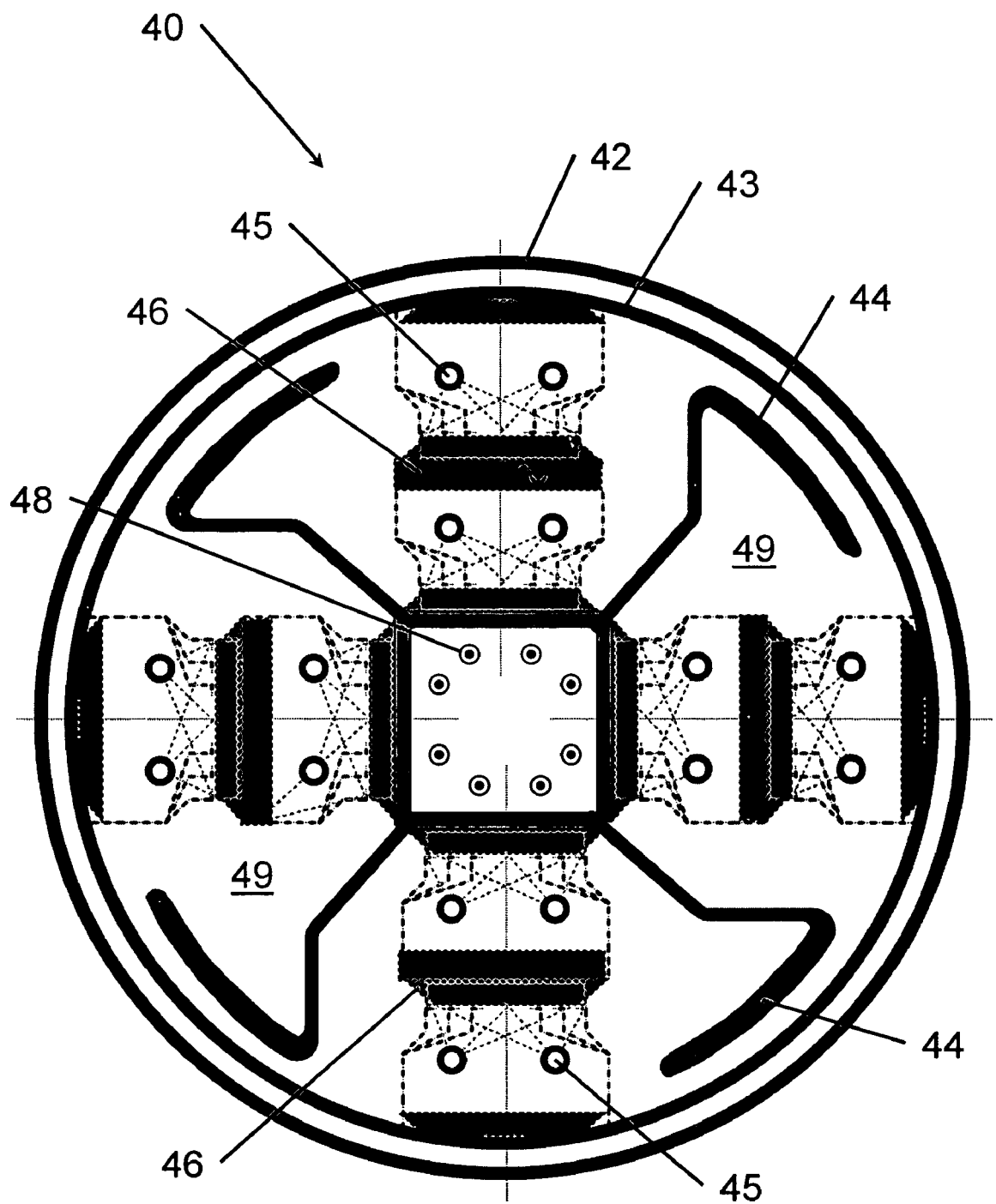
FIG. 5b is a front view of an embodiment of the hermetic terminal assembly.

FIGS. 5*a* and 5*b* show an example of the hermetic terminal assembly made using this invention method. The terminal can be used in conjunction with the cascaded die mounting technology described in U.S. patent application Ser. No. 10/716,060, filed Nov. 18, 2003. The routed services are shown, but not limited to, AC phase conductors, DC link conductors, gate signal leads, diagnostic signal wires, and refrigerant tubing. These services are routed into the hermetic container through the hermetic terminal assembly that is mounted to the container using a flange or threaded interfacing piece. A seal material is injected into the gaps and space among the service conduits and the inner wall of the terminal assembly casing.

The seal material is made of material that can be injected or poured and has a thermal expansion coefficient similar to that of the service conduits that are contacting the seal materials. The mechanical strength and the dielectric property of the seal material are sufficiently high for the temperature range that the terminal may encounter. As an example, the seal material can be a polymer containing graphite fibers for matching the thermal expansion coefficient of the service conduits and for reinforcing the mechanical strength of the seal material.

The DC link conductors can be arranged to have as much parallel arrangement as possible for lowering the inductance of the DC bus. The refrigerant tubing can also go through the terminal for the purpose of reducing the number of individual terminals.

Another embodiment of the terminal assembly made with this invention method, shown in FIG. 3, moves the refrigerant tubing 45 penetrations from the hermetic terminal assembly 40 to the top of the hermetic container 41 thereby supplying refrigerant to a refrigerant distributor (not shown) embedded in the terminal assembly 40.

Figure 6:
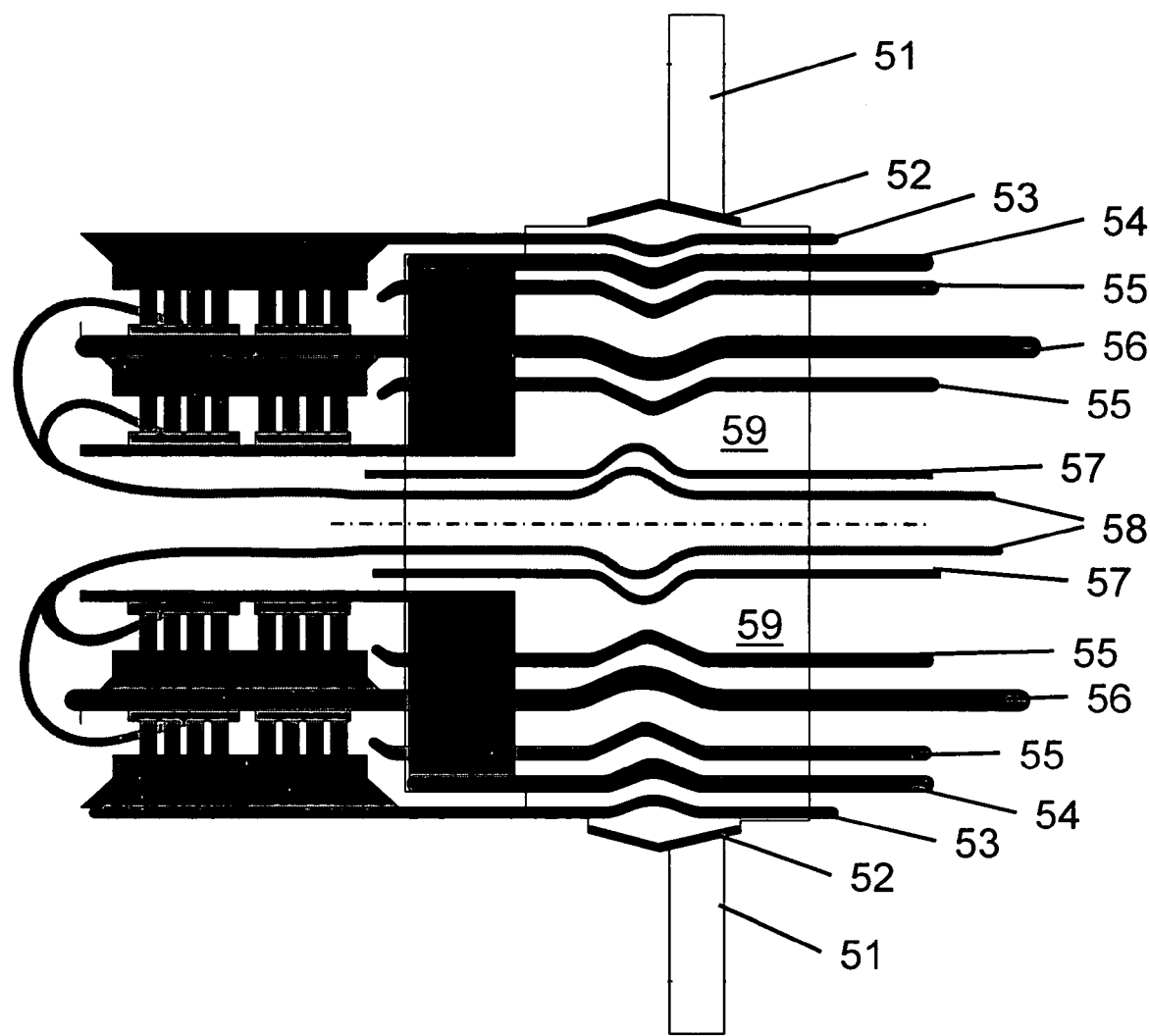
FIG. 6 shows another embodiment of the hermetic terminal assembly using tapered or bent shapes for stress modification.

FIG. 6 is a side view of an embodiment of the hermetic terminal assembly mounted in a hermetic container 51 that transfers a portion of the seal material 59 shearing stress to a compression stress using service conduits with tapered and bent shapes. The terminal assembly casing 52 encompasses a collection of service conduits identified as; negative DC link conductor 53, positive DC link conductor 54, refrigerant tubing 55, AC phase conductor 56, diagnostic signal wires 57, gate signal leads 58, and seal material 59.

Figure 7:
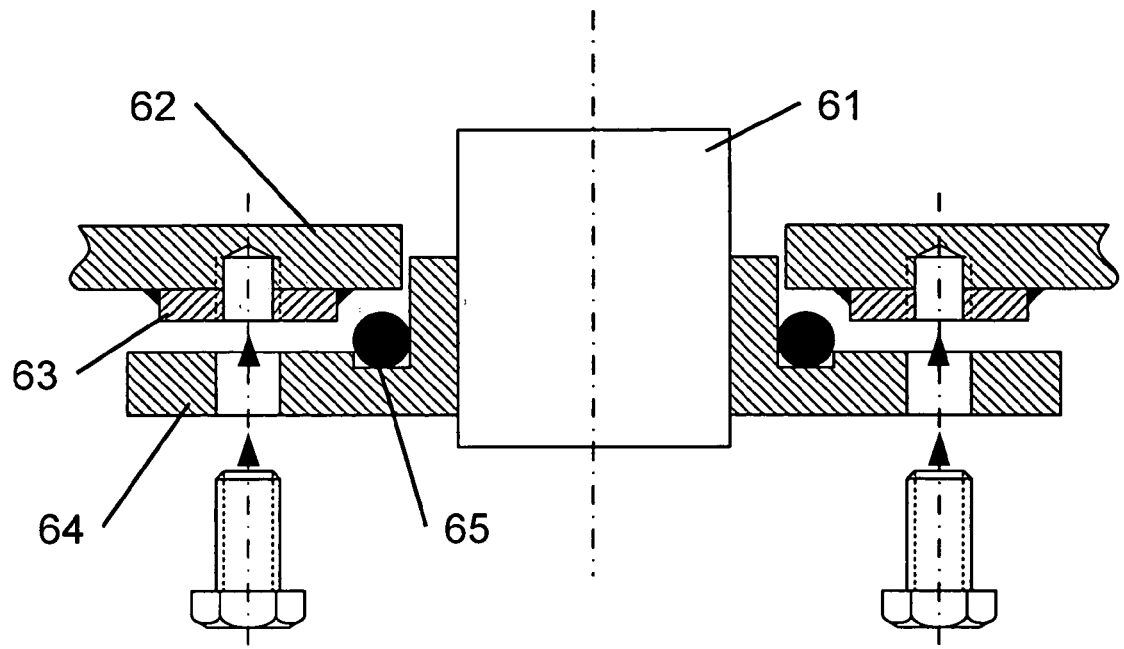
FIG. 7 is an example of flange O-ring mounting for the terminal assembly.

FIG. 7 is a mounting arrangement for the hermetic terminal assembly 61 where a terminal flange 64, housing the terminal assembly 61, is bolted to the hermetic container 62 with an O-ring seal 65 at the mating point. An optional boss 63 is used to provide bolt hole threading.

Figure 8:
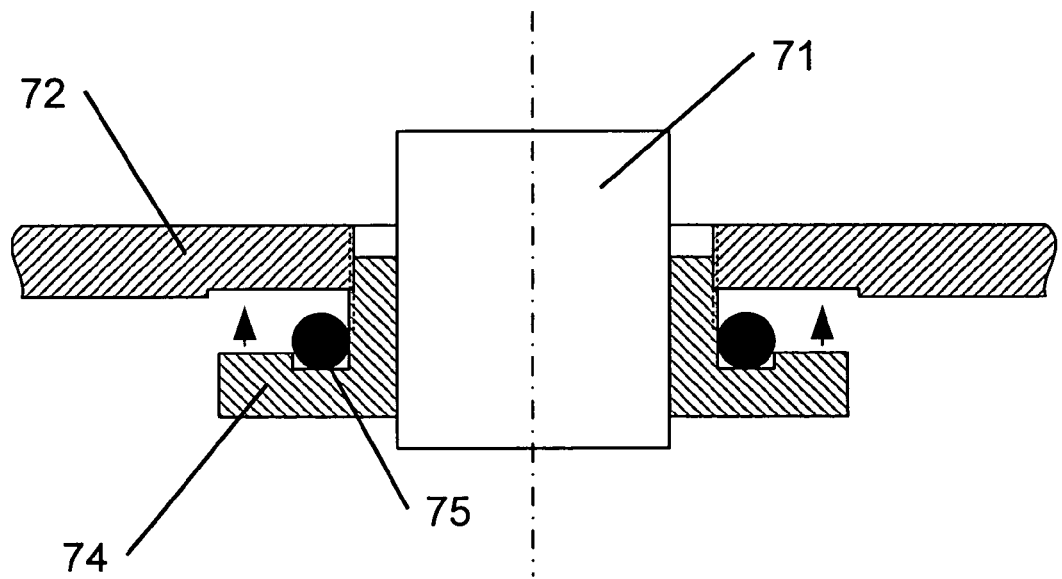
FIG. 8 is an example of threaded O-ring mounting for the terminal assembly.

FIG. 8 is a mounting arrangement for the hermetic terminal assembly 71 where a threaded terminal coupling 74, housing the terminal assembly 71, is threaded to the hermetic container 72 with an O-ring seal 75 at the mating point.

Some of the distinctive features of the assembly include:

1. A single terminal assembly to bring services that include but are not limited to the AC phase conductors, DC link conductors, gate signal leads, diagnostic signal wires, and refrigerant tubing are brought into the hermetic container through a flange or threaded interfacing piece.

2. The terminal assembly can be built with only electrical connections as shown in FIG. 2.

3. The seal material can be injected or poured and has a thermal expansion coefficient similar to that of the materials of the service conduits that are contacting the seal materials. The mechanical strength and the dielectric property of the seal material should be sufficiently high for the temperature range that the terminal may encounter. As an example, the seal material can be a polymer and graphite fibers mixture for matching the thermal expansion coefficient of the contacting materials and for reinforcing the mechanical strength of the seal material.

5. For a relatively large seal diameter part of the shearing stress can optionally be converted to a compression stress for the seal material using tapered or bent service conduits.

6. The DC link conductors can be in an axially aligned arrangement for lowering the inductance of the DC bus.

7. The refrigerant tubing can penetrate through the terminal for the purpose of reducing the number of individual terminals.

8. The gate-signal service conduit can feed the gate-drive circuit inside the hermetic container or outside of the container in the ambient pressure cooling zone.

9. The diagnostic-signal service conduit for the liquid refrigerant level, the die temperatures, over-currents, and over-voltages can also penetrate through the terminal assembly.

10. Additional leads can also be brought out from the terminal assembly if needed.

11. Either the flange with O-ring seal (or gasket) or the threaded interface with O-ring seal (or gasket) can be selected for mounting the terminal assembly.

The hermetic terminal assembly has potential for use in numerous industrial and military applications. Applications requiring high power and high differential pressure can be simplified using a total system approach to their interconnections. It is likely that a reduction in size and costs may be achieved. Systems that can benefit in this manner include: Automotive—future hybrid and fuel cell inverter and converter power requirements; Avionics and space—high power and differential pressures requirements offer unique challenges in hermetic terminal requirements, system approaches lowering volume and size can open up new possibilities for technical advancements. These advantages also pertain to and naval and marine underwater applications such as oil drilling and deep sea mining and exploration; Medical usages involving power requirements utilizing cryogenic, nuclear and laser techniques; Semiconductor processing requirements which currently require high vacuum systems for device fabrication. Uses can be expanded to also include more compact, lighter weight air conditioning and refrigeration compressor systems.

While there has been shown and described what are at present considered the preferred embodiments of the invention, it will be obvious to those skilled in the art that various changes and modifications can be made therein without departing from the scope.

We claim:

1. A method of making a hermetic terminal assembly at room temperature comprising the steps of:

inserting at least one of the group consisting of a temporary stop, a shim, a jig, or a combination thereof, on the bottom face of a terminal assembly thereby blocking assembly core open passageways, mounting the terminal assembly inside a vacuum chamber using a temporary assembly perimeter seal and flange or threaded assembly interfaces, mixing a seal admixture and hardener in a mixer conveyor to form a polymer seal material, conveying the polymer seal material into a polymer reservoir, feeding the polymer seal material from the reservoir through a polymer outlet valve and at least one polymer outlet tube into the terminal assembly core thereby filling interstitial spaces in the core adjacent to service conduits, temporary stop, and a terminal assembly casing, drying the polymer seal material at room temperature thereby hermetically sealing the core of the terminal assembly, removing the terminal assembly from the vacuum chamber, and removing the temporary stop, shim, jig, or combination thereof, wherein said seal admixture comprises a mixture of at least one polymer and at least one material selected from the group consisting of graphite fibers, ceramic powder, glass powder, and glass fibers, and at least one of the service conduits is configured with at least one of the group consisting of a taper and a bend for transferring a shear stress generated by a pressure difference across the polymer seal material into compression stress on the polymer seal material, wherein at least one of said service conduits passes from one side of said polymer seal material to another and wherein said hermetic terminal assembly is an electronic inverter/converter terminal assembly.

2. The method of claim 1 wherein said at least one polymer outlet tube further comprises a control arm.

3. The method of claim 1 further comprising the additional step of drawing a vacuum inside the vacuum chamber thereby vacuum feeding the polymer seal material.

4. The method of claim 1 further comprising the additional step of shaking the vacuum chamber to settle the polymer seal material in the terminal assembly core.

5. The method of claim 1 further comprising the additional step of alternating the pressure in the vacuum chamber from vacuum to pressure thereby exerting settling forces on the seal material and eliminating voids in the seal material.

6. The method of claim 1, wherein said seal premixture matches a thermal expansion coefficient of the service conduit, the terminal assembly casing, or a combination thereof.

7. The method of claim 1, wherein at least one of the service conduits is configured with a taper for transferring a shear stress generated by a pressure difference across the polymer seal material into compression stress on the polymer seal material.

8. The method of claim 1, wherein at least one of the service conduits is configured with a bend for transferring a shear stress generated by a pressure difference across the polymer seal material into compression stress on the polymer seal material.

9. The method of claim 1, wherein said service conduits comprise a refrigerant service conduit.

10. A method of making a hermetic terminal assembly at higher than room temperature comprising the steps of:

inserting at least one of the group consisting of a temporary stop, a shim, a jig, or a combination thereof, on the bottom face of a terminal assembly thereby blocking assembly core open passageways, mounting the terminal assembly inside a vacuum chamber using a temporary assembly perimeter seal and flange or threaded assembly interfaces, premixing a seal premixture, placing the seal premixture into a polymer reservoir, feeding the seal premixture from the reservoir through a polymer outlet valve and at least one polymer outlet tube into the terminal assembly core thereby filling interstitial spaces in the core adjacent to service conduits, temporary stop, and a terminal assembly casing, curing the polymer seal material at higher than room temperature thereby hermetically sealing the core of the terminal assembly, removing the terminal assembly from the vacuum chamber, and removing the temporary stop, shim, jig, or combination thereof, wherein said seal premixture comprises a mixture of at least one polymer, at least one material selected from the group consisting of graphite fibers, ceramic powder, glass powder, and glass fibers, and a hardener, and at least one of the service conduits is configured with at least one of the group consisting of a taper and a bend for transferring a shear stress generated by a pressure difference across the polymer seal material into compression stress on the polymer seal material, wherein at least one of said service conduits passes from one side of said polymer seal material to another and wherein said hermetic terminal assembly is an electronic inverter/converter terminal assembly.

11. The method of claim 10 wherein said at least one polymer outlet tube further comprises a control arm.

12. The method of claim 10 further comprising the additional step of drawing a vacuum inside the vacuum chamber thereby vacuum feeding the polymer seal material.

13. The method of claim 10 further comprising the additional step of shaking the vacuum chamber to settle the polymer seal material in the terminal assembly core.

14. The method of claim 10 further comprising the additional step of alternating the pressure in the vacuum chamber from vacuum to pressure thereby exerting settling forces on the seal material and eliminating voids in the seal material.

15. The method of claim 10, wherein said seal premixture matches a thermal expansion coefficient of the service conduit, the terminal assembly casing, or a combination thereof.

16. The method of claim 10, wherein at least one of the service conduits is configured with a taper for transferring a shear stress generated by a pressure difference across the polymer seal material into compression stress on the polymer seal material.

17. The method of claim 10, wherein at least one of the service conduits is configured with a bend for transferring a shear stress generated by a pressure difference across the polymer seal material into compression stress on the polymer seal material.

18. The method of claim 10, wherein said service conduits comprise a refrigerant service conduit.

\* \* \* \* \*